US012494593B2

(12) United States Patent
White et al.

(10) Patent No.: US 12,494,593 B2
(45) Date of Patent: Dec. 9, 2025

(54) ACTIVE RECEIVE ANTENNA

(71) Applicant: HRL LABORATORIES, LLC, Malibu, CA (US)

(72) Inventors: Carson White, Malibu, CA (US); Ryan Quarfoth, Malibu, CA (US); Amit Patel, Malibu, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 318 days.

(21) Appl. No.: 18/356,364

(22) Filed: Jul. 21, 2023

(65) Prior Publication Data

US 2025/0030178 A1 Jan. 23, 2025

(51) Int. Cl.
*H01Q 23/00* (2006.01)
*H01Q 13/18* (2006.01)

(52) U.S. Cl.
CPC ............. *H01Q 23/00* (2013.01); *H01Q 13/18* (2013.01)

(58) Field of Classification Search
CPC ............................... H01Q 23/00; H01Q 13/18
See application file for complete search history.

(56) References Cited

U.S. PATENT DOCUMENTS

| | | | | |
|---|---|---|---|---|
| 8,121,544 | B2 * | 2/2012 | Shimizu | H01Q 13/10 343/756 |
| 8,487,821 | B2 * | 7/2013 | Duron | H01Q 1/2216 343/729 |
| 11,528,042 | B1 * | 12/2022 | Quarfoth | H01Q 5/50 |
| 11,605,895 | B1 * | 3/2023 | White | H03F 3/193 |
| 2003/0174095 | A1 * | 9/2003 | Sievenpiper | H01Q 13/18 343/770 |
| 2018/0277961 | A1 * | 9/2018 | Abiri | H01Q 23/00 |

* cited by examiner

*Primary Examiner* — David Bilodeau
(74) *Attorney, Agent, or Firm* — Lewis Roca Rothgerber Christie LLP

(57) ABSTRACT

An exemplary receive antenna having a conductive surface. The conductive surface includes an aperture configured to operate as a slot antenna, and one or more amplifiers or buffer amplifiers is electrically connected across the aperture. At least one feed is connected between the one or more amplifiers and the aperture. An input impedance $Z_B$ of each of the one or more amplifiers at the at least one feed location is lower than 0.5× an impedance of the aperture $Z_A$ at a first resonance frequency.

20 Claims, 11 Drawing Sheets

100

ACTIVE RECEIVE ANTENNA

STATEMENT REGARDING FEDERALLY SPONSORED RESEARCH OR DEVELOPMENT

This invention was made with Government support, contract number 18-C-8681. The Government has certain rights in this invention.

FIELD

The present disclosure relates to an active receive antenna, and more particularly to a conformal antenna with broadband reception.

BACKGROUND INFORMATION

In known antenna designs an input impedance of the antenna must be matched to a transmission line impedance (e.g., 50 Ohms) for proper signal reception within a specified bandwidth. A poor impedance match directly degrades receiver sensitivity. The general rule of thumb for a receive antenna is that the amplifier should have high input impedance to maximize the input voltage.

Conformal antennas can include flat array antennas that are designed to follow a prescribed shape over a slot or aperture. These antennas are suitable for mounting on curved surfaces of land, air, and space vehicles. The gain of the conformal antenna is dependent on the antenna's shape. Conformal antennas can have a small bandwidth due to the strong resonant loading of the cavity backing, which results in a high quality factor and a narrowband response. Several techniques have been used to reduce the quality factor but can result in poor reception.

Broadband receive antennas can come in various forms and configurations, such as a blade antenna, active monopole antenna, an active dipole antenna, a passive cavity-backed-slot antenna, and a loop-stick antenna.

Blade antennas are used in designs requiring broadband sensitive reception. These antennas are designed to protrude from the conductive surface on which it is mounted. In known implementations, a blade antenna extends from the mounting surface in a normal direction. The physical profile of the blade antenna and its mounting characteristics can negatively impact aerodynamics of a vehicle, as well as fuel economy. Moreover, in some platforms and applications, the shape and placement of a blade antenna on the conductive surface could increase the antenna's susceptibility to breakage.

Active monopole and dipole antennas are unique in that a poor impedance match does not necessarily affect receiver sensitivity. Further, these antennas are capacitive and operate below the first resonance. An active monopole antenna has a rod-shaped conductor that extends in a normal direction or perpendicular to the conductive surface to which it is mounted. The active dipole antenna has two identical rod conductors that extend perpendicularly from the conductive plane. In aerospace applications, the active monopole and dipole antennas can be implemented in the shape of a blade antenna.

Passive cavity-backed-slot antennas are used as high-gain sensitive conformal antennas. One drawback is that they operate in a narrowband. Several techniques can be used to increase bandwidth, but also lead to a reduction in gain and receiver sensitivity.

Loop-stick antennas can be formed with a core of material with magnetic permeability surrounded by a coil of wire.

Loop-stick antennas achieve broad bandwidth and can be deployed conformally, but they have low antenna gain and, therefore, poor sensitivity.

SUMMARY

An exemplary receive antenna is disclosed comprising: a conductive surface having an aperture configured to operate as a slot antenna; and one or more amplifiers electrically connected across the aperture, at least one feed connected between the one or more amplifiers and the aperture; wherein an input impedance $Z_B$ of each of the one or more amplifiers at the at least one feed location is lower than 0.5× an impedance of the aperture $Z_A$ at a first resonance frequency.

Another exemplary receive antenna is disclosed, comprising: a conformal slot antenna formed in a conductive surface; and plural buffers electrically connected to the slot antenna, wherein each buffer includes an input stage and an output stage, the input stage having a lower impedance than the output stage.

DESCRIPTION OF THE DRAWINGS

Other features and advantages of the present disclosure will become more apparent upon reading the following detailed description in conjunction with the accompanying drawings, wherein like elements are designated by like numerals, and wherein.

DETAILED DESCRIPTION

Exemplary embodiments of the present disclosure are directed to an active conformal receive antenna that includes a slot in a conductive surface, thereby forming a conformal slot antenna. The slot antenna is coupled to at least one amplifier having an input impedance that is substantially lower than a resonant impedance near a resonance frequency of the slot. The slot can be enclosed on one side by an electromagnetic (EM) cavity, such that it only receives radiation from one side. The electromagnetic cavity can be sized, whereby a first EM resonance occurs near the first EM resonance frequency of the slot. Furthermore, the low-impedance buffer amplifier preferably comprises a common-gate input stage, further preferably comprising high-electron-mobility transistors (HEMTs), gallium arsenide transistors, or gallium nitride transistors as desired.

Figure 1:
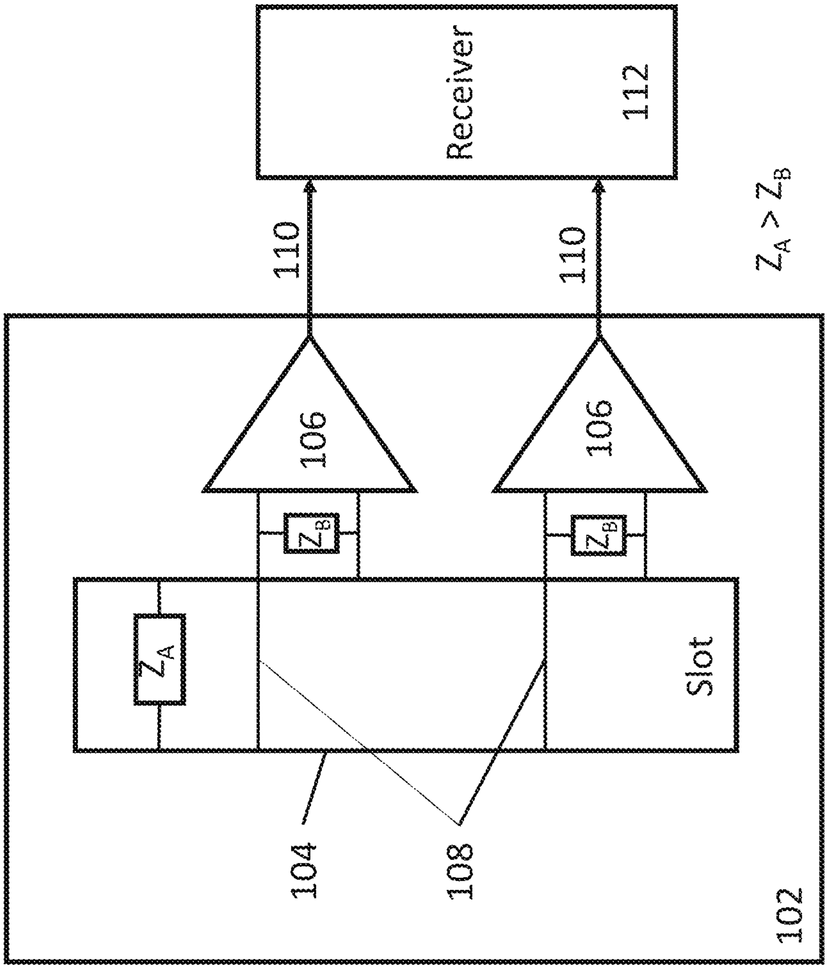
FIG. 1 illustrates a receive antenna in accordance with an exemplary embodiment of the present disclosure.

FIG. 1 illustrates a receive antenna in accordance with an exemplary embodiment of the present disclosure. As shown in FIG. 1, the receive antenna 100 includes a conductive surface 102 having an aperture 104 configured to operate as a slot antenna. The conductive surface 102 can be part of a large conductive plane that is included in the body of a structure such as a moveable structure or vehicle that travels on land or in aerospace. In some examples, this surface may be approximately planar in close proximity of the aperture 104. The aperture 104 can be conformal in that the opening follows the shape of the conductive surface into which it is formed. The aperture 104 can be in the form of a slot that is cut into the conductive surface 102. It should be readily apparent that the slot can be formed in a variety of shapes suitable for performing the operation disclosed herein. According to an exemplary embodiment, the aperture 104 can be a rectangular slot having a large aspect ratio. According to another exemplary embodiment, the aperture 104 can be a slot formed as a ring. The slot 104 can have a large input impedance such as 300Ω or greater, for example.

Figure 2:
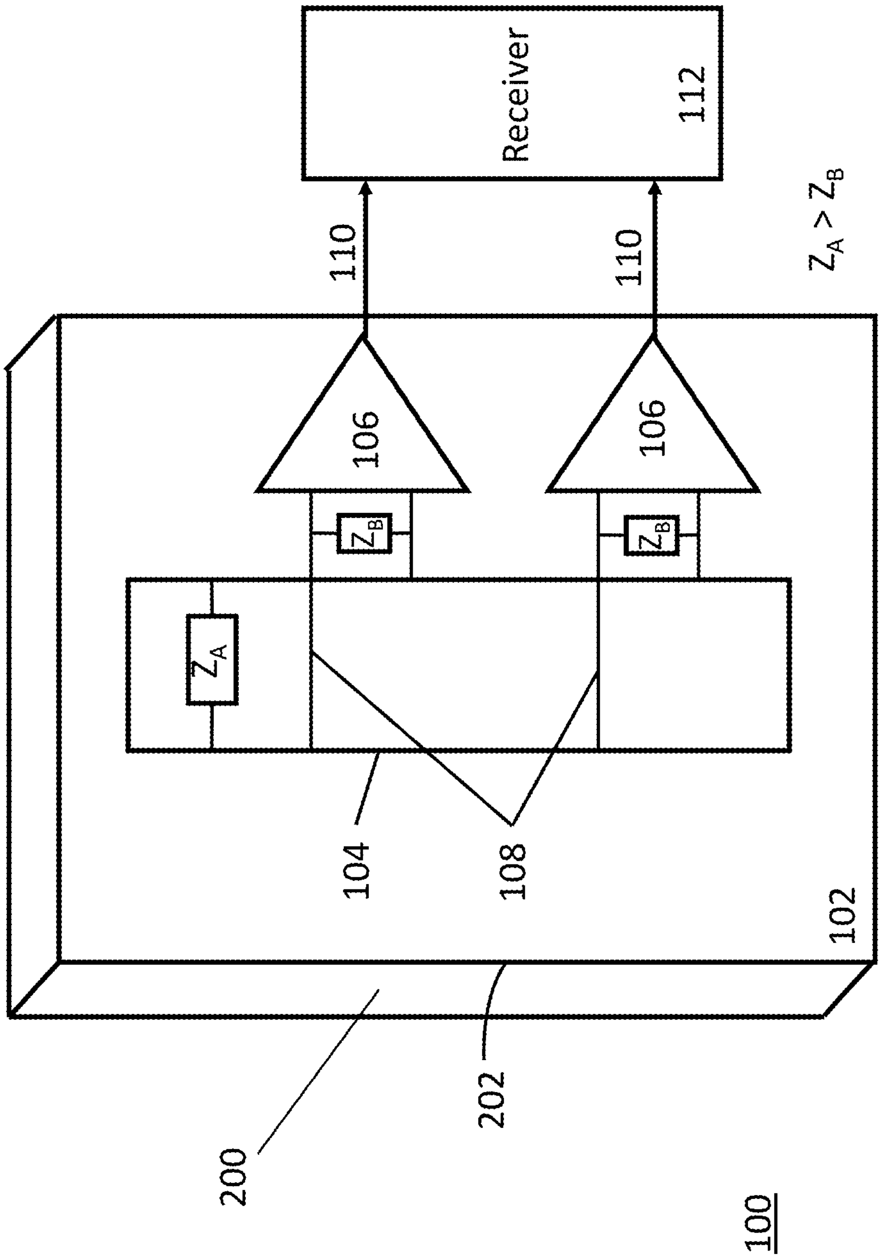
FIG. 2 illustrates a cavity-backed slot antenna (CBSA) in accordance with an exemplary embodiment of the present disclosure.

FIG. 2 illustrates a cavity-backed slot antenna (CBSA) in accordance with an exemplary embodiment of the present disclosure. As shown in FIG. 2, an area of the conductive surface 102 and the aperture/slot 104 of the slot antenna of FIG. 1, can be backed by a conductive cavity 200 that allows reception only on a side or face of the slot antenna 100 having the aperture 104. The back side 202 of the face of the antenna 100, which has the conductive cavity 200 isolates the antenna 100 from the environment. The conductive cavity 200 has electrically conductive walls and a hollow interior. The cavity 200 is sized such that its first EM resonance occurs near the first EM resonance frequency of the slot 104. The conductive cavity 200 can have depth (d), length (l), and height (h) selected such that a first resonance frequency of the conductive cavity 200 is near the first resonance frequency of the slot 104. According to an exemplary embodiment, the conductive cavity 200 can have the following dimensions: length=width=1 m, depth=0.25 m, slot length=0.97 m and slot width=0.01 m. Given these dimensions, the slot antenna can resonate at 160 MHz with impedance approximately 1000 Ohms.

The antenna 100 can include one or more amplifiers 106 that are electrically connected across the width of the aperture 104. Each of the one or more amplifiers 106 is disposed no more than one tenth of a wavelength (λ) from the aperture. According to an exemplary embodiment, each amplifier 106 can include a common gate amplifier or common base amplifier. Use of the common gate amplifier or common base amplifier supports wideband performance of the low input impedance and overcomes the low gain using amplifier gain. The amplifier 106 is designed to have low noise when connected to the high impedance of the slot antenna 100. At least one feed 108 is connected between the one or more amplifiers 106 and the aperture or slot 104. According to an exemplary embodiment, the amplifier 106 can be configured as a buffer that provides electrical impedance transformation from the slot 104 to the one or more receiver 112. The input terminal of the buffer can be configured to have a length less than λ/10 and impedance set at any value. The output terminal of the buffer can be configured to have an impedance (Z0) that is matched to an impedance of the transmission line. The length of the output terminal of the buffer can be equal to or substantially equal to the length of the input terminal. According to an exemplary embodiment, the impedance Z0 of the output terminal can be 50 ohms, 75 ohms, 120 ohms or any other suitable value as desired based on the transmission line it is connected to. In one example, the length of the output is compensated for by the impedance value if the length of the input and output of the buffer are not equal.

Figure 3A:
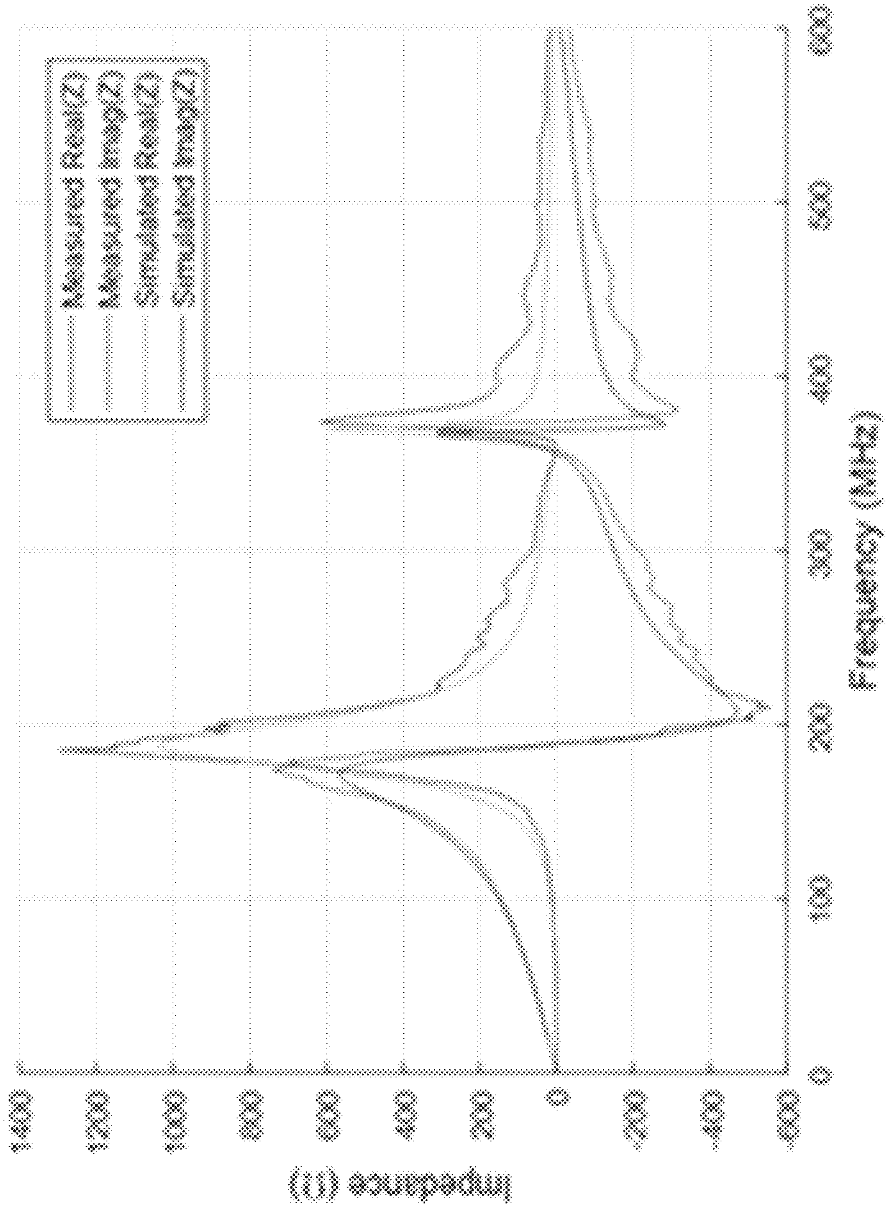
FIG. 3A illustrates a performance of the slot antenna based input impedance in accordance with an exemplary embodiment of the present disclosure.

FIG. 3A illustrates a performance of the slot antenna based input impedance in accordance with an exemplary embodiment of the present disclosure. As shown in FIG. 3A, an input impedance $Z_B$ of each of the one or more amplifiers at the at least one feed location is lower than 0.5× an impedance of the aperture $Z_A$ at a first resonance frequency. For example, the first resonance frequency of the slot antenna can occur below 200 MHz where the impedance at resonance of the aperture is at 1000 Ohms.

Figure 3B:
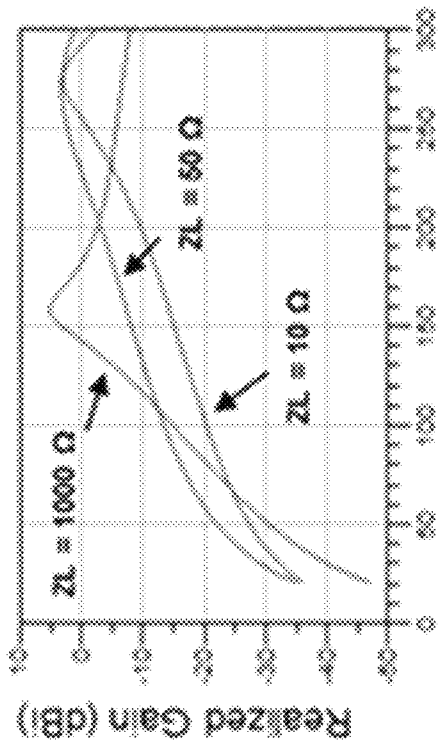
FIG. 3B Prior Art
FIGS. 3B and 3C illustrate performance of a slot antenna in accordance with a known implementation.
Figure 3C:
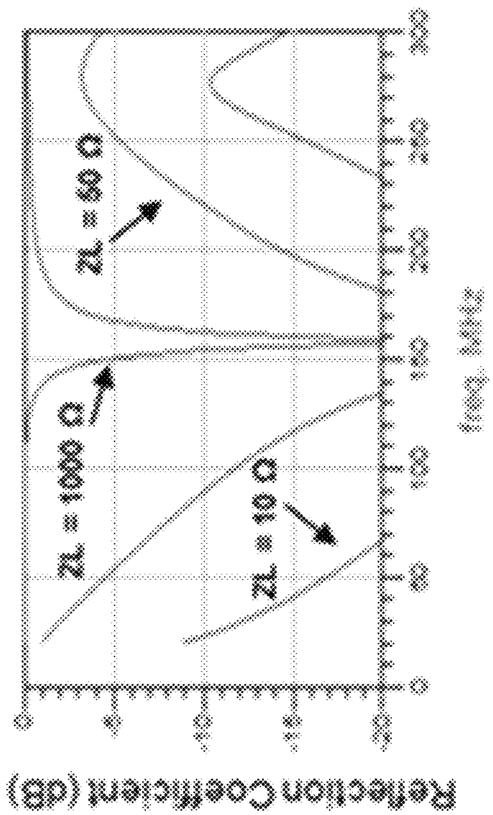
FIG. 3C Prior Art

FIGS. 3B and 3C illustrate performance of a slot antenna in accordance with a known implementation. As shown in FIG. 3B, the antenna can be matched to a line impedance (ZL) using lossy (e.g., resistive or absorptive) means. A lossy match can be assumed because if the antenna is not matched then there is a large standing wave on the transmission line, which is often not acceptable. From FIG. 3A it is shown that the first resonance frequency of the slot antenna occurs below 200 MVHz. FIG. 3B shows that broadband impedance matching is possible but that the gain is reduced. For example, the realized gain for matching the line impedance at 1000 ohms, is greater than the gain for the line impedance at either 50 ohms or 10 ohms. As shown in FIG. 3C, the relative fraction of the incident RF power that is reflected due to an impedance mismatch occurs across a much narrower range of frequencies for a line impedance of 1000 ohms, than it does for a line impedance of 50 ohms or 10 ohms. From the plots of FIGS. 3B and 3C it should be readily apparent that the bandwidth can be broadened by reducing the feed impedance. However, reducing the feed impedance 108 with passive means results in a reduction in the realized gain.

Figure 4:
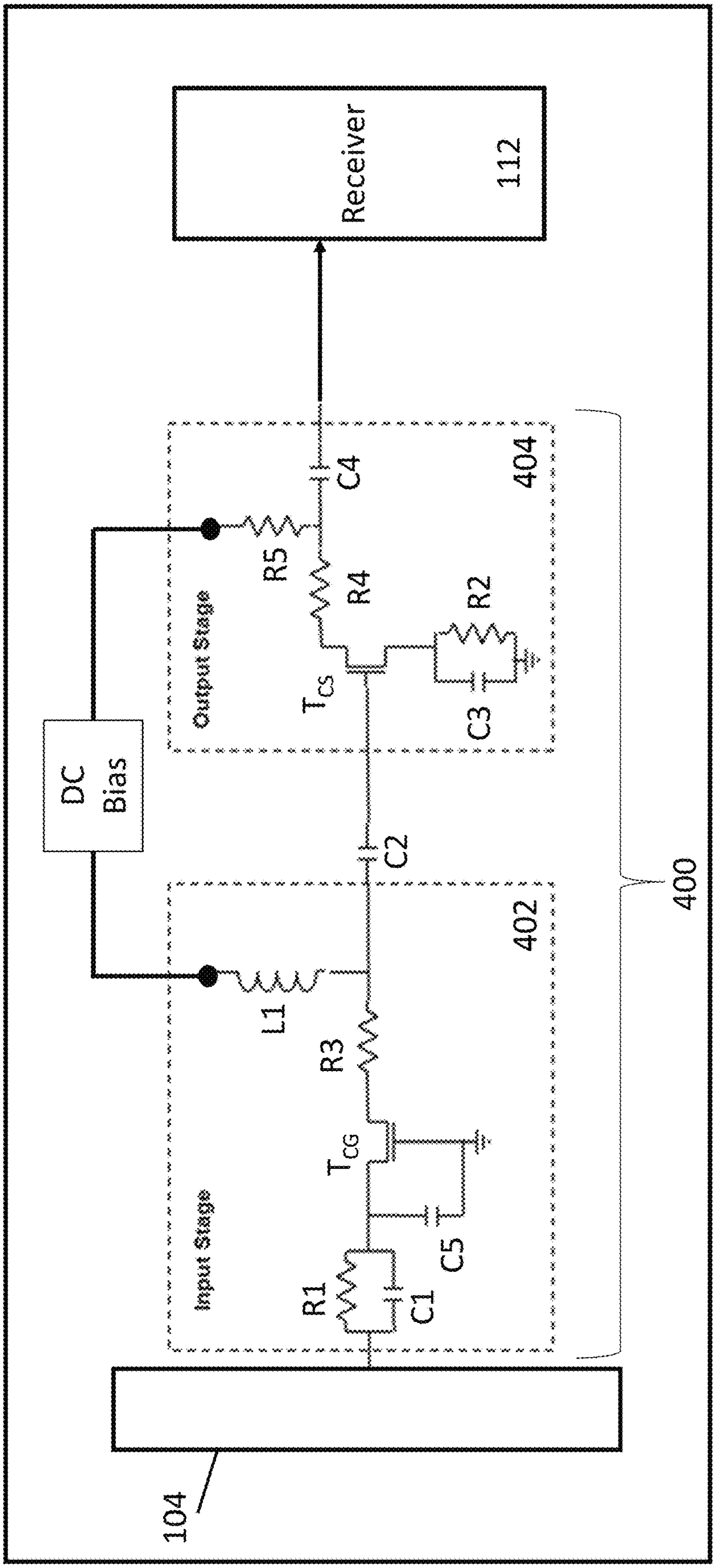
FIG. 4 illustrates a buffer amplifier in accordance with an exemplary embodiment of the present disclosure.

FIG. 4 illustrates a buffer amplifier in accordance with an exemplary embodiment of the present disclosure. As shown in FIG. 4, the buffer amplifier 400 can be connected to receive a signal from the slot antenna 104. The buffer amplifier 400 can include an input stage 402 and output stage 404. The buffer amplifier 400 can be configured to: 1) allow the antenna 100 to be loaded with impedances lower than a receiver impedance while 2) providing an impedance match to the receiver (which enables arbitrarily long transmission lines without standing waves), and 3) providing better receive sensitivity. A key parameter for a receiver 112 is the minimum (e.g., smallest) detectable signal, which is calculated by:

$$MDS_{dBm} = -174 + NF + 10\log B + 10\log(SNR) \tag{1}$$

Where NF is the noise figure (i.e., the noise factor in dB), B is the bandwidth and SNR is the signal to noise ratio. According to an exemplary embodiment, the receive antenna can be a 2-port model for the purposes of calculating the NF including the slot antenna. From known receiver chain analysis, the noise factor is given by:

$$F = F_A + \frac{F_B - 1}{G_{av,A}} + \frac{F_{RX} - 1}{G_{av,A}G_{av,B}} = \frac{1}{\eta_{rad}}\left(F_B + \frac{F_{RX} - 1}{G_{av,B}}\right) \quad (2)$$

Where $F_A$, $F_B$, and $F_{RX}$ are the noise factors of the antenna 100, buffer 400 and receiver 112, respectively, and $G_{aV,A}$ and $G_{aV,B}$ are the available gains of the antenna 100 and buffer 400, respectively. When the buffer gain $G_{aV,B}$ is high the last term of Equation 2 is negligible and the noise factor simplifies to $$F \approx \frac{F_B}{\eta_{rad}}$$

The noise factor of the buffer depends on its noise parameters (Fmin, Rn, and Yopt), not the reflection coefficient compared to its conjugate match:

$$F_B = F_{min} + \frac{R_n}{\mathrm{Re}\{Y_A\}}|Y_A - Y_{opt}|^2 \quad (3)$$

It should be understood that in the context of the exemplary embodiments described herein, the input and output stages of the buffer amplifier can comprise any transistors suitable for use within the desired frequency range of the receive antenna 100. For high electron mobility (HEMT) field effect transistor (FET) devices at low frequencies, under certain circumstances the $Y_{opt}$ can be close to zero under certain conditions. This correlates to high impedance, making it well-suited to receive signals from the high impedance resonant slot. Furthermore, $R_n$ can be <20 Ohms and Fmin can be <<1 dB. Furthermore, the noise parameters are nearly identical for both the common source (high input impedance) and the common gate (low input impedance), despite the substantial differences in input impedance between them. The common gate transistor $T_{CG}$, for example, has an input impedance equal to the inverse of the transconductance. Therefore, an input impedance of the amplifier 106 of about 10 or 50 Ohms is achievable. These results provide an improvement over the prior art when compared with the plots of FIGS. 3B and 3C as already discussed.

The simplification of the noise factor in Equation 2 assumes that the buffer gain is high to neglect the receiver noise. The voltage gain of the common gate amplifier depends on the ratio of the load impedance to the input impedance (which is high). According to exemplary embodiments, discussed herein a high impedance load should be provided for the common gate amplifier to achieve sufficient gain so that a low system noise figure can be attained when considering following or downstream stages (see Equation 2 above). For example, the voltage gain should be high so that the contribution of receiver noise to the system noise figure is negligible. The high voltage gain further specifies that the output stage 404 provides a high impedance load to the common gate input stage 402. In some examples, the output stage 404 may be a common source amplifier. One of ordinary skill in the art will recognize that additional components can be used for, signal filtering and power supply decoupling. For example, capacitors C1, C2 of the input stage 402 and capacitors C3, C4 of the output stage 404 can be selected to have low impedance in the RF band for the purpose of DC blocking and/or RF bypass. According to an exemplary embodiment, the buffer amplifier 400 can be self-biased, where the common gate transistor $T_{CG}$ and the common source transistor $T_{CS}$ are depletion-mode FETs wherein a desired gate-source voltage $V_{gs}$ for a desired bias current $I_d$ is less than zero (0) volts, and resistors R1 and R2 can set the bias current using a relation $R=-V_{gs}(I_d)/I_d$. In one example, $I_d$ is 17 mA, $V_{gs}$(17 mA)=−0.46 V, and R1 and R2 are 27 Ohms. Resistors R3 and R4 can provide stability for the transistors $T_{CG}$ and $T_{CS}$ as desired. Capacitor C5 can be added to the input stage for stability at a capacitance of 10 pF, for example. Resistor R5 may be set to enable the flow of bias current to the output stage while supplying impedance match to a desired output impedance. In one example, the desired output impedance is 50 Ohms and R5 is between 25 and 200 Ohms, and in another example R5 may be between 50 and 100 Ohms. In yet other examples, the output stage may be biased using active loads or inductive chokes (which may increase the gain) and impedance matched to a transmission line using an impedance matching network, which may include inductors, capacitors, and/or transformers as desired. The input stage may be biased using an inductive choke, L1, which may be chosen to have high impedance in a desired frequency band. In other examples, L1 may resonate with the input impedance of the output stage. In still other examples, the input stage may be biased with an active load or with a resistor.

Figure 5:
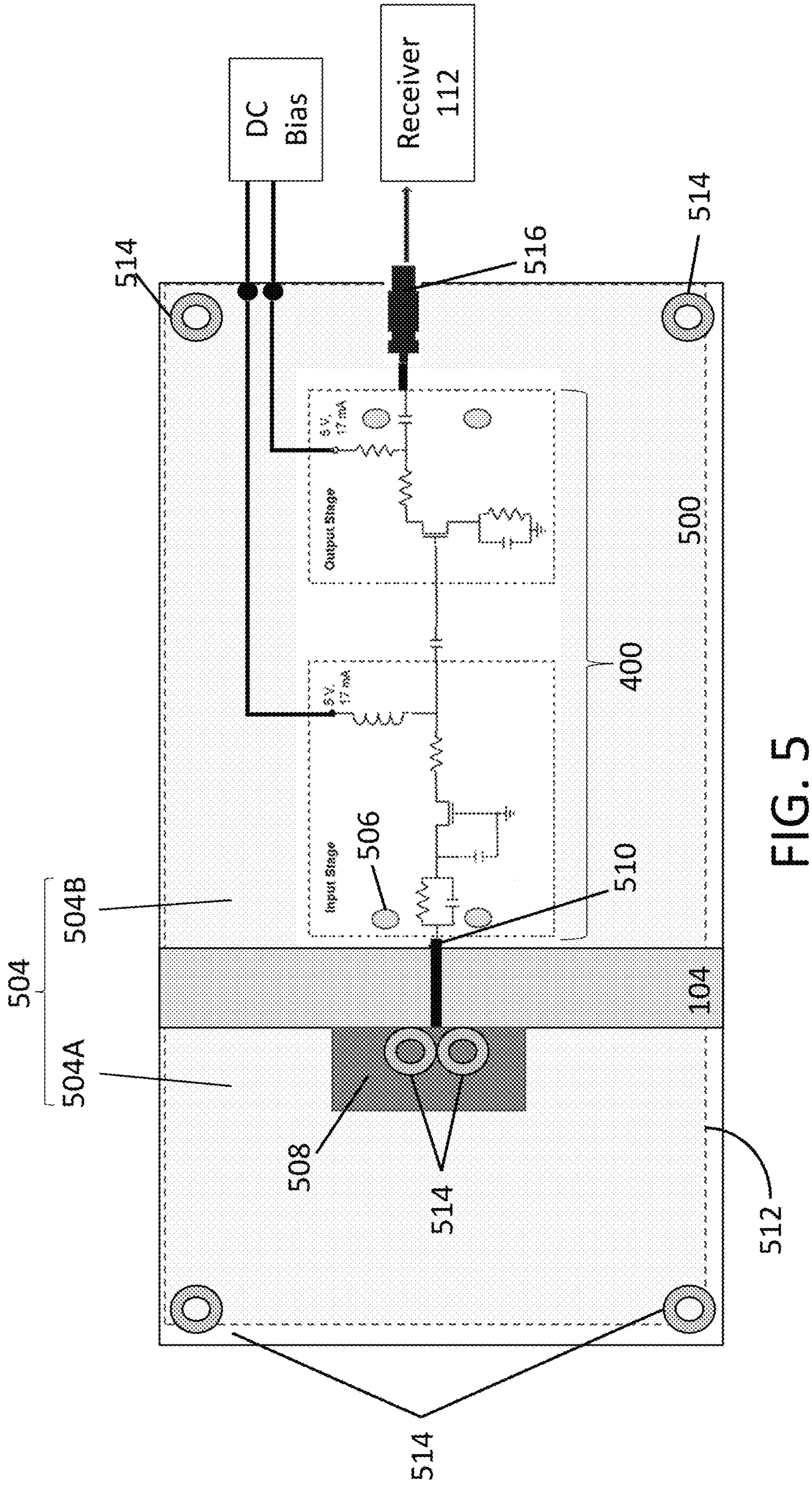
FIG. 5 illustrates a buffer amplifier mounted to a PCB in accordance with an exemplary embodiment of the present disclosure.

FIG. 5 illustrates a buffer amplifier mounted to a PCB in accordance with an exemplary embodiment of the present disclosure. As shown in FIG. 5, the components of the buffer amplifier 400 can be mounted to a printed circuit board (PCB) 500. For example, the PCB can have a bottom side or face with a slot antenna cutout 104 (shaded portion). The surface 504 or bottom layer of the PCB 500 that surrounds the slot 104 can be metallized to form a conductive surface. The layer 504 is configured as a left ground plane 504A to the left of the slot 104 and as a right ground plane 504B to the right of the slot 104. The PCB 500 includes vias 506 that connect the feed plane 508 and buffer input node 510, respectively, to the bottom conductive surface 504. Plated through holes 514 accommodate a conductive connection of fasteners between the PCB 500 and the slot metallization 504. For example, the plated through holes 514 connects the ground plane 504 to the PCB ground plane 512. Electrical connection is made with these conductive fasteners, and physical contact between two conductors. The PCB 500 also includes a connector 516 which is configured to connect the output of the buffer 400 to the receiver 112. According to exemplary embodiments, the connector 516 can be a coaxial cable connector, a subminiature version A (SMA) connector, or other suitable connectors as desired. In correlating the circuit elements of FIG. 1 to those of FIG. 5, the feed 108 includes the right ground plane 504B, the vias 506, feed plane 508, the buffer input 510, and the plated through holes 514. Further, the conductive surface 102 of FIG. 1 includes the ground plane 504 (left ground plane 504A, right ground plane 504B). The vias 506 can connect or bond the right side of the slot 102 (ground sided of the feed 108) to the PCB 500.

Figure 6A:
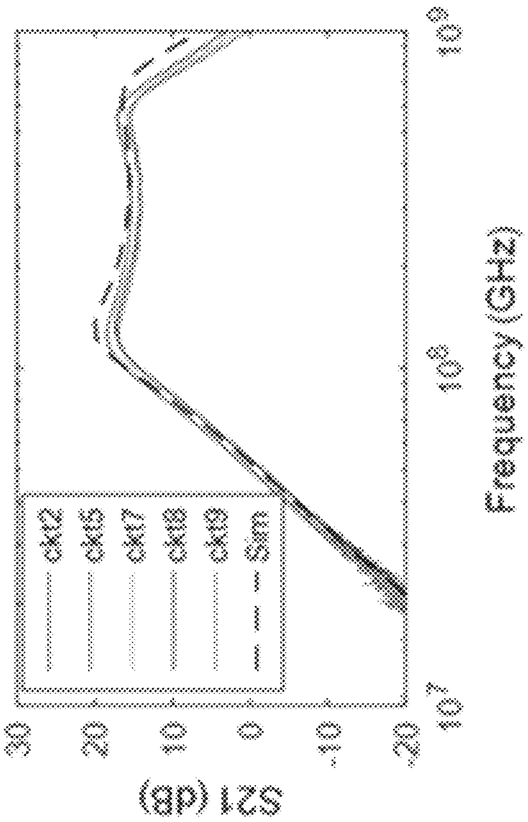
FIGS. 6A and 6B illustrate performance of the buffer of FIG. 4 based on antenna impedance and gain according to an exemplary embodiment of the present disclosure.
Figure 6B:
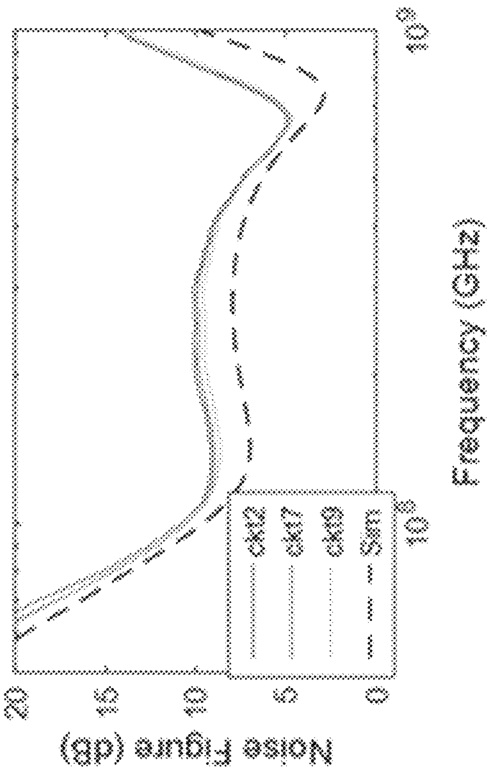

FIGS. 6A and 6B illustrate performance of the buffer of FIG. 4 based on antenna impedance and gain according to an exemplary embodiment of the present disclosure. The buffer was tested using a surrogate circuit model of a cavity-backed antenna with a center feed, where the surrogate model is composed of a network of capacitors and inductors. As shown in FIG. 6A, S21 corresponds to the active transducer gain for cavity backed antenna with a center feed. The active transducer gain is the ratio of the realized antenna gain (including amplifier gain) to the directivity. As shown in FIG. 6B, the noise figure is inversely proportional to the minimum (e.g., smallest) detectable signal (MDS), under an assumption that receiver noise is neglected because of sufficient antenna gain.

Figure 7A:
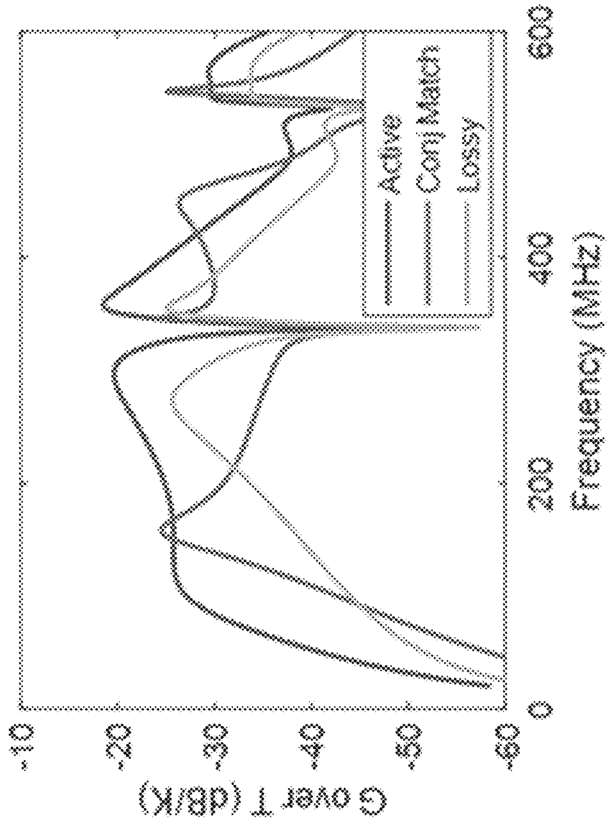
FIGS. 7A and 7B illustrate reception performance of the slot antenna having a buffer amplifier of FIG. 4 in accordance with an exemplary embodiment of the present disclosure.
Figure 7B:
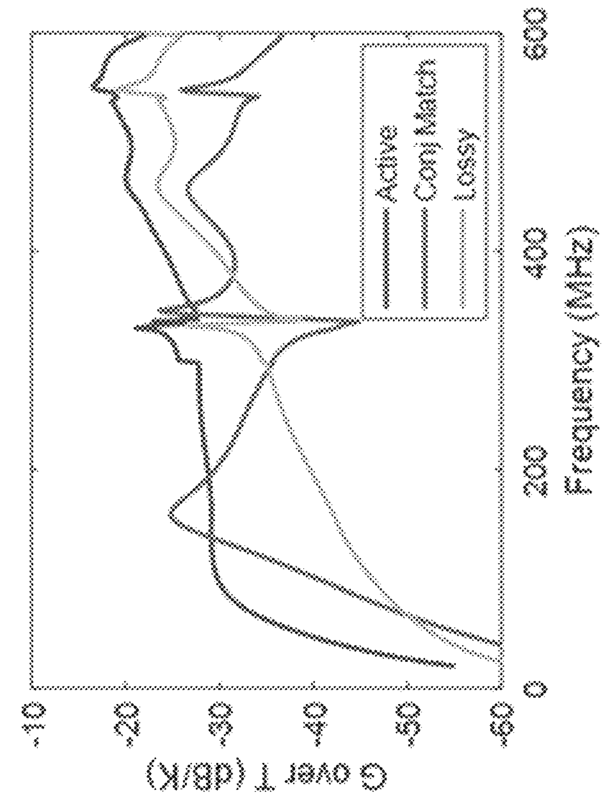

FIGS. 7A and 7B illustrate reception performance of the slot antenna having a buffer amplifier of FIG. 4 in accordance with an exemplary embodiment of the present disclosure. The plots shown in FIGS. 7A and 7B simulate the reception performance of the antenna at broadside assuming a receiver with a 5 dB noise figure and a background noise temperature of 290 K. The Gain (G) over Temperature (T) (G/T) metric is inversely proportional to MDS. The response of an active slot antenna of the present disclosure is compared to a narrowband conjugate match and a broad-band lossy match both to 40 Ohms, which is comparable to the input impedance of the buffer 400. As shown in FIG. 7A, the active impedance matching provided through the buffer 400, gives comparable sensitivity to the conjugate match but over a much broader band. FIG. 7B shows that increasing the number of feeds of the slot antenna 104 of the present disclosure from 1 to 4 provides high G/T over more bandwidth and covers most of the band up to 600 MHz.

Figure 8:
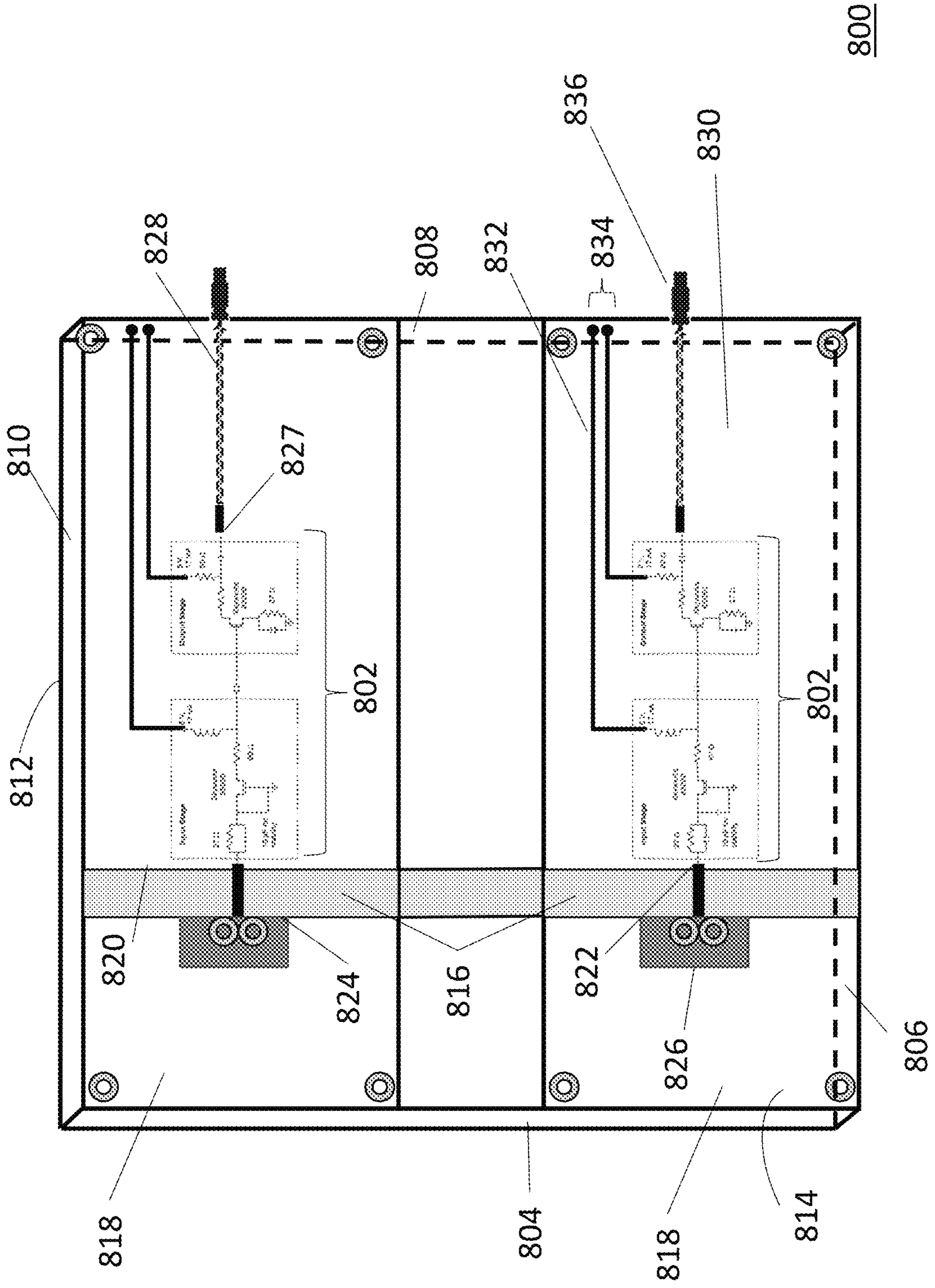
FIG. 8 illustrates a CBSA with plural buffer amplifiers according to an exemplary embodiment of the present disclosure.

According to an exemplary embodiment, just as the slot antenna of FIG. 2 can include plural amplifiers 106, the cavity-backed slot antenna of FIG. 8 can include plural buffers. FIG. 8 illustrates a CBSA 800 with plural buffer amplifiers 802 according to an exemplary embodiment of the present disclosure. As shown in FIG. 8, the CBSA 800 can include five (5) solid walls 804, 806, 808, 810, 812 and a top sheet 814 with a slot 816 cut in it. For proper operation, each wall 804, 806, 808, 810, 812 of the CBSA 800 is conductive, and can be composed of any suitable metal such as aluminum, for example. According to an exemplary embodiment, the aluminum material can be plated with an additional metal, such as chromate to avoid the formation of insulating oxide that hampers electrical connection. Each buffer 802 can be mounted on a PCB 818 as shown in FIG. 5. The plural PCBs 818 can be electrically connected, through a direct connection or suitable mechanical coupling device (e.g., fasteners) as desired. A right side 820 of the slot 816, which corresponds to the right ground plane 504B, is coupled to signal sources 822 (e.g., antenna feed) at the input of the buffers 802 and a left side 824 of the slot 816, which corresponds to the left ground plane 504A is coupled to feed plane 826. The feed plane 826 can be coupled to the input transistor gates of each buffer through the antenna feed 822. According to an exemplary embodiment, the slot 816 can be connected at a DC ground potential through the ground plane 504 and can therefore carry a DC bias current. The output 827 of each buffer 802 can be connected to RF cabling 828 for carrying the RF signal. According to an exemplary embodiment the cabling can be coaxial cabling or any suitable cabling as desired. According to another exemplary embodiment, the cabling can be routed along the underside of the top sheet 814 and inside the cavity 830 to one of the plural sidewalls 804, 806, 808, 810, 812 where the cables can be connected to a suitable RF connector 836 as desired, such as RF coaxial connectors for example. Furthermore, DC power cables 832 can be routed from the buffers to a DC feedthrough 834. FIG. 5 shows a connection of the antenna circuit to a DC Bias, which is also applicable to the circuit of FIG. 8. According to yet another exemplary embodiment, the RF cabling 828 is shielded via the top sheet 814 to prevent higher order resonances.

The exemplary embodiment of FIG. 8 can be implemented in several different configurations. For example, one exemplary configuration includes the top sheet 814 being a metal layer such as aluminum, and the buffers 802 being mounted to a PCB 818 bonded to the top sheet 814. The transmission lines to the receiver 112 can include coaxial cabling. Another exemplary configuration includes the top sheet 814 being formed on a first PCB and the buffers 802 can be mounted to separate second PCBs. The feed lines 822 that supply the input signal to the buffers 802 can be integrated into the surface (e.g., layers) of the first PCB. In this second exemplary configuration, the board-to-board connectors can be used for connecting the first and second PCBs. In yet another exemplary configuration, the top sheet of 814 can be formed on a PCB which also includes the buffers 802. The feed lines 822 to the buffer input can be integrated into the surface (e.g., layers) of the PCB.

Figure 9:
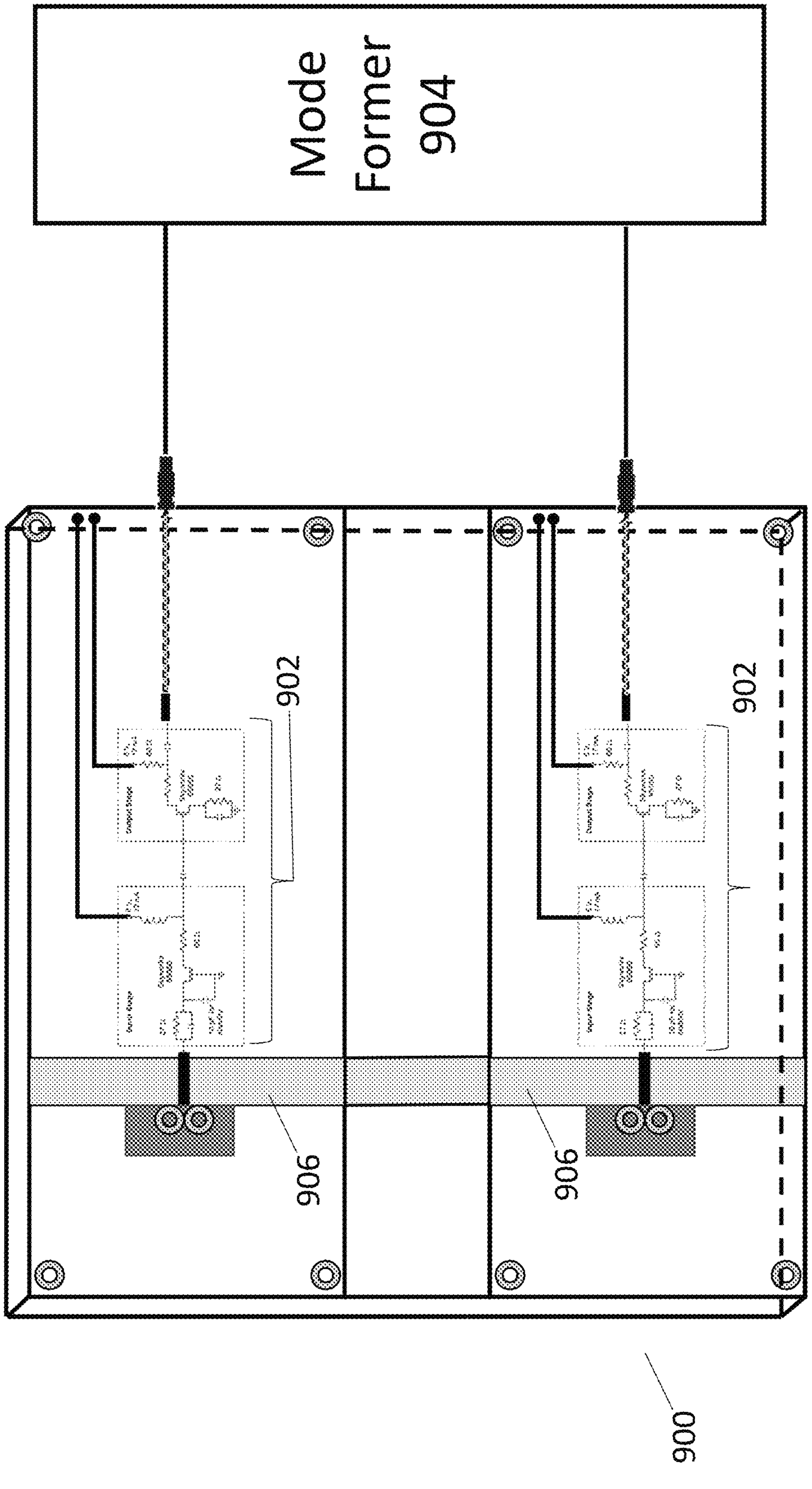
FIG. 9 illustrates a cavity-backed slot antenna connected to a mode former in accordance with an exemplary embodiment of the present disclosure.

FIG. 9 illustrates a cavity-backed slot antenna 900 connected to a mode former in accordance with an exemplary embodiment of the present disclosure. As shown in FIG. 9, outputs of plural buffer amplifiers 902 can be fed to one or more mode formers 904 to create any linear combination of the plural amplifiers 902. Each amplifier 902 is connected to receive signals from a distinct location on the slot antenna 900. Therefore, each amplifier corresponds to a specific radiation pattern related to its distinct location and electrical connection to the slot antenna 900. For example, the mode former can combine the amplifier outputs by adding them all in phase to make a single mode with a broadside pattern. According to another exemplary embodiment, the mode former 904 can combine even and odd modes of the antenna 900 via the buffer amplifiers 902, where the even mode is the broadside pattern of the single mode, and the odd mode is zero at broadside. The combination of the even and odd modes can be used in monopulse direction finding. According to yet another exemplary embodiment, mode former 900 can combine the outputs from the plural buffer amplifiers 902 with a variable phase shift to make a beam that can be scanned over different angles. It should be readily apparent that while FIG. 9 illustrates only one mode former 904, the exemplary embodiment could be modified where the number of mode formers 904 is expanded to two or more based on the number of buffer amplifiers 902. In generating a linear combination, the one or more mode formers can be configured to add (e.g., sum) the outputs of the plural amplifiers in-phase. According to exemplary embodiments, the relative phase shifts from the aperture of the slot antenna to a respective port of the mode former 904 should be within +/−90 degrees of a mean phase. Furthermore, it should be understood that the relative phase shifts are ideally identical. According to another exemplary embodiment, the aperture 906 of the slot antenna 900 is divided into two halves, the one or more mode formers 904 receive the signals at a respective port via the amplifier 902, where the signals received from the first half of the aperture are added with a phase of substantially zero degrees and the signals from the second half of the aperture are added with phase of substantially 180 degrees. According to yet another exemplary embodiment, the mode former can be configured with a port that adds the outputs of the plural amplifiers in-phase, a port that adds signals received from a first half of an aperture with a phase of substantially zero degrees, and a port that adds signals from a second half of an aperture with a phase of substantially 180 degrees. It should be understood that the one or more mode formers 904 can be configured to process signals received from the aperture according to any suitable beamforming technique as desired.

Figure 10:
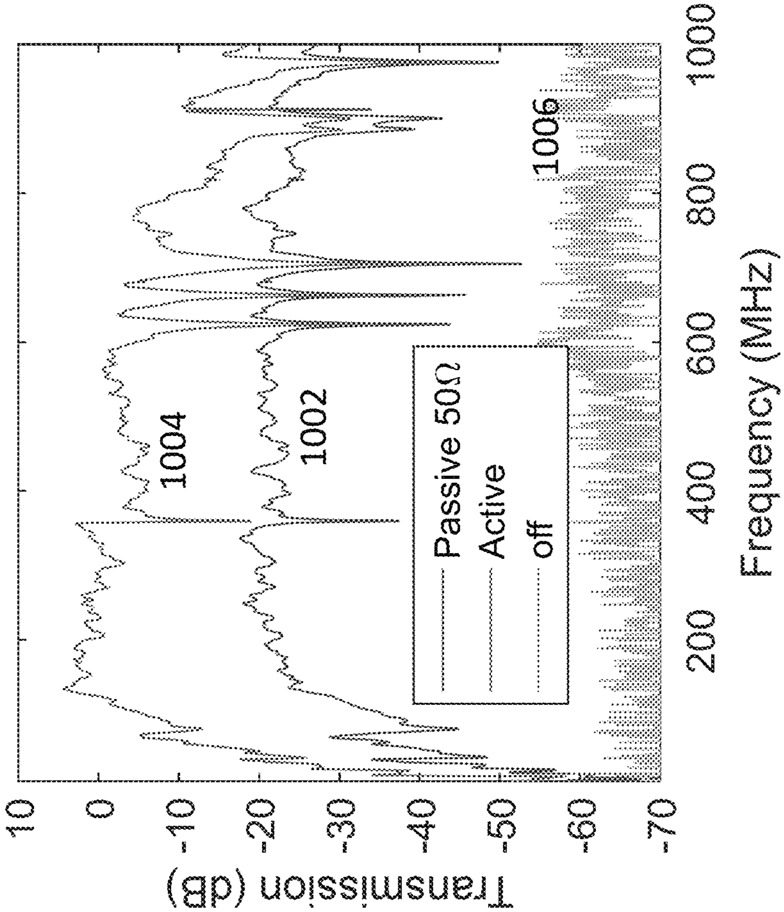
FIG. 10 illustrates measured transmission of the antenna of FIG. 9 in accordance with an exemplary embodiment.

FIG. 10 illustrates measured transmission of the antenna of FIG. 8 in accordance with an exemplary embodiment. As shown in FIG. 10, the buffers 802 provide wideband high gain transmission. The transmission response 1002 shows results obtained when the cavity slot antenna has no buffers 802, and instead includes 50 Ohm transmission lines. The transmission response 1002 was measured with a broadband biconical antenna (e.g., AH systems SAS 545) co-polarized about 15 inches from the slot 816. The transmission response 1004 represents antenna operation under conditions in which the buffers 802 are present and powered on. The transmission response 1006 shows antenna operation under conditions in which the buffers 802 are present but powered off. From the plots 1002 and 1004, it should be readily apparent that the use of buffers 802 in a cavity slot antenna can increase the gain by >20 dB over a broad band. When the buffers 802 are off, as shown in plot 1006, the transmission is negligible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein. Additionally, the disclosure of a range of values is a disclosure of every numerical value within that range, including the end points.

What is claimed is:

1. A receive antenna, comprising:

a conductive surface having an aperture configured to operate as a slot antenna;

one or more amplifiers electrically connected across the aperture; and at least one feed connected between the one or more amplifiers and the aperture;

wherein an input impedance $Z_B$ of each of the one or more amplifiers at the at least one feed location is lower than 0.5× an impedance of the aperture $Z_A$ at a first resonance frequency.

2. The antenna of claim 1, wherein the aperture includes a conductive cavity.

3. The antenna of claim 2, wherein a first resonance frequency of the conductive cavity is near the first resonance frequency of the aperture.

4. The antenna of claim 1, wherein the at least one amplifier is disposed no more than one tenth of a wavelength (λ) from the aperture.

5. The antenna of claim 1, wherein the first resonance frequency of the aperture is below 2 GHz.

6. The antenna of claim 1, wherein a length of the aperture is less than 0.5 wavelengths.

7. The antenna of claim 1, wherein the at least one amplifier comprises a common gate amplifier or common base amplifier.

8. The antenna of claim 1, wherein the at least one amplifier is a buffer having an input stage and an output stage.

9. The antenna of claim 8, wherein the input stage includes a common gate amplifier, and the output stage includes a common source amplifier.

10. The antenna of claim 8, wherein an input impedance of the input stage is lower than an input impedance of the output stage.

11. The antenna of claim 8, wherein at least one of the input stage and the output stage is configured as a monolithic integrated circuit.

12. The antenna of claim 8, wherein the buffer is interfaced to the slot antenna through an electrical connection.

13. The antenna of claim 1, wherein the at least one amplifier includes plural amplifiers and the at least one feed includes plural feeds, the antenna comprising:

a mode former having plural ports configured for producing linear combinations of outputs received from the plural amplifiers.

14. The antenna of claim 1, wherein the at least one amplifier includes plural amplifiers and the at least one feed includes plural feeds, and wherein a number of outputs corresponding to the plural amplifiers is greater than or equal to a number of signals received by the plural feeds.

15. The antenna of claim 1, wherein the at least one amplifier includes plural amplifiers and the at least one feed includes plural feeds, the antenna being configured to operate over a bandwidth and comprises:

wherein a spacing between the plural feeds is less than one wavelength at a maximum frequency.

16. A receive antenna, comprising:

a conformal slot antenna formed in a conductive surface; and plural buffers electrically connected to the slot antenna, wherein each buffer includes an input stage and an output stage, the input stage having a lower impedance than the output stage.

17. The receive antenna of claim 16, comprising:

plural feeds connected between the slot antenna and the plural buffers;

plural ports, wherein each port is connected to receive an output produced by one of the plural buffers;

a mode former connected to receive a signal from each port and generate linear combinations of outputs produced by the plural buffers.

18. The receive antenna of claim 17, wherein to generate the linear combination of outputs produced by the plural buffers, the mode former is configured to:

sum all the received outputs in-phase.

19. The receive antenna of claim 17, wherein an aperture of the slot antenna is divided into two halves and to generate the linear combination of outputs produced by the plural buffers, the mode former is configured to:

sum the received signals from a first half of the aperture with a phase of substantially zero degrees; and sum the received signals from a second half of the aperture with a phase of substantially 180 degrees.

20. The receive antenna of claim 17, wherein an aperture of the slot antenna is divided into two halves and to generate the linear combination of outputs produced by the plural buffers, the mode former is configured to:

sum all the received outputs in-phase;

sum the received signals from a first half of the aperture with a phase of substantially zero degrees; and sum the received signals from a second half of the aperture with a phase of substantially 180 degrees.

* * * * *